US007385986B2

(12) United States Patent
Ono et al.

(10) Patent No.: US 7,385,986 B2
(45) Date of Patent: Jun. 10, 2008

(54) PACKET TRANSFER METHOD AND APPARATUS

(75) Inventors: Masahiro Ono, Tokyo (JP); Yasuhiko Matsunaga, Tokyo (JP)

(73) Assignee: NEC Corporation, Tokyo (JP)

(*) Notice: Subject to any disclaimer, the term of this patent is extended or adjusted under 35 U.S.C. 154(b) by 949 days.

(21) Appl. No.: 10/294,702

(22) Filed: Nov. 15, 2002

(65) Prior Publication Data
US 2003/0112802 A1 Jun. 19, 2003

(30) Foreign Application Priority Data
Nov. 16, 2001 (JP) ............................ 2001-351252

(51) Int. Cl.
H04L 12/56 (2006.01)
(52) U.S. Cl. .................... 370/395.4; 370/437
(58) Field of Classification Search ............. 370/229, 370/231–232, 235, 395.21, 395.31, 395.32, 370/395.4–395.52, 412–418
See application file for complete search history.

(56) References Cited

U.S. PATENT DOCUMENTS 6,651,101 B1* 11/2003 Gai et al. ................... 709/224
7,058,974 B1* 6/2006 Maher et al. ................. 726/13
2002/0181484 A1* 12/2002 Aimoto ...................... 370/413
2002/0194345 A1* 12/2002 Lu et al. ..................... 709/227

FOREIGN PATENT DOCUMENTS

JP 2002-314592 A 10/2002

OTHER PUBLICATIONS

M. Shreedhar et al., "Efficient Fair Queuing using Deficit Round Robin", Proc. ACM SIGCOMM, Oct. 16, 1995, pp. 1-22.
S. Floyd et al., "Random Early Detection Gateway for Congestion Avoidance", IEEE/ACM Transactions on Networking, vol. 1, No. 4, Aug. 1993, pp. 397-413.

* cited by examiner

*Primary Examiner*—Chi Pham
*Assistant Examiner*—Thai Hoang
(74) *Attorney, Agent, or Firm*—Sughrue Mion, PLLC

(57) ABSTRACT

A packet transfer apparatus includes a packet classifying section and scheduler. The packet classifying section identifies a connection used for transfer of data between a transmission terminal and a reception terminal from not less than one field contained in a header of a reception packet received from the transmission terminal and detects establishment and release of the connection. The scheduler performs transfer control on a reception packet for each connection on the basis of the connection information of each connection identified by the packet classifying section. A packet transfer method and a program are also disclosed.

12 Claims, 11 Drawing Sheets

| SOURCE ADDRESS PORT NUMBER | DESTINATION ADDRESS PORT NUMBER | QUEUE IDENTIFIER | TRANSFER DATA AMOUNT |
|---|---|---|---|
| 100.100.100.100: 10000 | 200.200.200.200: 20000 | 1 | 1000 |
| ⋮ | ⋮ | ⋮ | ⋮ |

PACKET TRANSFER METHOD AND APPARATUS

BACKGROUND OF THE INVENTION

The present invention relates to a packet transfer method and apparatus which fairly transfer packets between a plurality of connections when the packets are to be transferred by using TCP (Transmission Control Protocol) used in the Internet and the like.

Conventionally, in packet communication, the fairness between connections has been improved by devising a packet scheduling scheme in packet transfer apparatuses. As a conventional scheduling scheme, a technique called DRR (Deficit Round Robin) is available (see, e.g., M. Shreedhar, G. Varghese, "Efficient fair queuing using deficit round robin", Proc. ACM SIGCOMM 1995).

The above DRR will be described below with reference to FIGS. 14 and 15. This packet transfer apparatus includes an input terminal 001, a connection information storage section 002, a packet classifying section 003, a queue manager 004, a queue set 005 including queues 006 to 008, a default queue 011, scheduler 009, and an output terminal 010.

If the packet transfer apparatus shown in FIG. 14 is installed between a plurality of communication apparatuses which perform packet communication using TCP/IP, packets input through the input terminal 001 are classified according to connections by the packet classifying section 003. The packet classifying section 003 performs header analysis to identify a proper connection by recognizing the connection on the basis of a set of a connection protocol type, source address, source port number, destination address, and destination port number.

If it is determined as a result of the header analysis that TCP is used as a transport layer protocol and a connection establishment packet in which a SYN flag is set in the TCP header portion has been received, the queue manager 004 generates a new queue, and new connection information containing a set of source and destination address port numbers and the identifier information of the generated queue is registered in the connection information storage section 002. The packet is then stored in the generated queue. If it is determined as a result of the header analysis that TCP is used as a transport layer protocol and a data packet has been received, the queue manager 004 inquires of the connection information storage section 002 by using the set of source and destination address port numbers as a key, thereby obtaining the identifier of a queue in which the packet should be stored and storing the packet in the queue.

If it is determined as a result of the header analysis that TCP is used as a transport layer and a connection release packet in which a FIN flag in the TCP header portion is set has been received, the queue manager 004 obtains the identifier of a queue in which the packet should be stored from the connection information storage section 002 by using the set of source and destination address port numbers as a key, and stores the packet in the corresponding queue. Thereafter, the queue manager 004 requests the connection information storage section 002 to erase the corresponding registered information. Upon reception of the request to erase the registered information, the connection information storage section 002 erases the connection information after a lapse of a predetermined period of time. Furthermore, if it is determined as a result of the header analysis that a packet using a protocol such as UDP (User Datagram Protocol), other than TCP, as a transport layer protocol has been received, the packet is stored in the default queue 011 set in advance, and a band is ensured independently of the TCP connection, thereby processing this queue.

The connection information storage section 002 holds timers for the respective connections for the case of abnormal ends of TCP connections, and deletes connection information if no packet is input in a predetermined period of time. When a queue is to be added, the queue manager 004 may perform active queue management, e.g., RED (see Random Early Detection: S. Floyd, V. Jacobson., "Random early detection gateways for congestion avoidance", IEEE/ACM trans. networking, 1995) in which a packet is dropped in accordance with a certain condition. The input packet is added to one of the queues 006 to 008 for each connection through such processing.

The scheduler 009 selects one of the queues 006 to 008 in the queue set 005, extracts a packet from the head of the queue, and outputs the packet to the network via the output terminal 010. When the output terminal 010 finishes transmitting the packet, the scheduler 009 selects a packet to be transmitted next.

Queue selection, i.e., packet transfer control, in the scheduler 009 is like the processing shown in FIG. 15. Assume that in this case, the default queue and the queues for the respective connections are processed at the timings respectively assigned to the queues. The DRR scheduler 009 sequentially selects queues by the round robin scheme, and determines for each queue in the following manner whether to output a packet. At this time, a variable called a deficit counter is prepared for each queue for each connection, and the deficit counter is reset to 0 upon connection establishment.

First of all, when packet transfer at the output terminal 010 is completed and a packet to be transferred next is to be selected, the scheduler 009 determines whether the current timing is for the default queue 011 to be processed (step S1). If the current timing is for the default queue to be processed, the scheduler 009 checks whether the default queue is empty (step A10). If the default queue is empty, the flow immediately returns to step S1. If the default queue is not empty, the leading packet in the default queue is transmitted (step A11), and the flow returns to step S1 again.

If it is determined in step S1 that the current timing is not for the default queue to be processed, the scheduler 009 checks whether the queue to be processed is empty (step S2). If there is no packet to be transmitted in this queue, the deficit counter is reset (step S7), and the processing of this queue is terminated.

If it is determined in step S2 that the queue is not empty, a constant called quantum is added to the deficit counter (step S3), and the size of the packet at the head of the queue is compared with the deficit counter (step S4). If the deficit counter is larger, the packet is output (step S5). A value corresponding to the packet size is then subtracted from the deficit counter (step S6), and the flow returns to step S5 again. If the deficit counter is smaller than the size of the leading packet, the value of the deficit counter is stored (step S8), and the processing of this queue is terminated.

After the queue processing is terminated, the scheduler 009 checks whether all the queues are empty (step S9). If all the queues are not empty, the flow shifts to step S1 to process the queue selected next. If all the queues are empty, the series of packet transfer control operations is terminated. As a result, the transfer rates for the respective connections are almost averaged to maintain the fairness between the connections to an extent corresponding to the time required to transmit data having a data length determined by quantum.

According to such a conventional packet transfer control method, however, even with the use of a fair schedule such as a DRR scheduler, when data are to be transferred by using TCP that is generally used in the Internet, the smaller the data to be transferred in a connection, the lower the throughput. That is, fairness in throughput between connections cannot be ensured. When, in particular, TCP communication is performed by using HTTP (HyperText Transfer Protocol) which is widely used when Web browsing is done in the Internet, most of data transfer is for small files, but large files are seldom transferred, resulting in high unfairness.

The following is the reason for this. TCP includes slow start operation of exponentially increasing the transmission rate from the low rate immediately after connection establishment, and congestion avoiding operation of linearly increasing the transmission rate a given period of time after connection establishment. If the size of data to be transferred is small, a connection is terminated during slow start operation, and the throughput tends to decrease.

SUMMARY OF THE INVENTION

It is an object of the present invention to provide a packet transfer method and apparatus which can improve the fairness between TCP connections through which the data with different sizes are transferred.

In order to achieve the above object, according to the present invention, there is provided a packet transfer apparatus which is connected to a packet communication network and transfers a packet from a transmission terminal to a reception terminal, comprising packet classifying means for identifying a connection used for transfer of data between the transmission terminal and the reception terminal from not less than one field contained in a header of a reception packet received from the transmission terminal and detecting establishment and release of the connection, and a scheduler which performs transfer control on a reception packet for each connection on the basis of connection information of each connection identified by the packet classifying means.

DESCRIPTION OF THE PREFERRED EMBODIMENTS

The present invention will be described in detail below with reference to the accompanying drawings.

Figure 1:
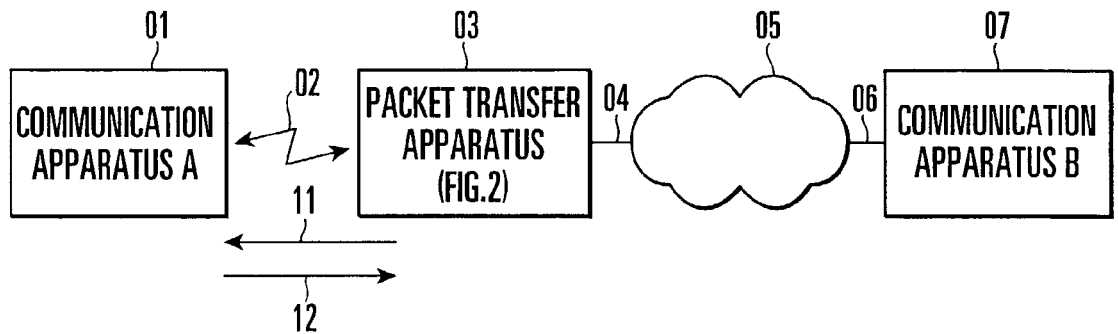
FIG. 1 is a block diagram showing a packet communication system according to an embodiment of the present invention.

FIG. 1 shows a packet communication system according to an embodiment of the present invention. This communication system is comprised of a communication apparatus (A) 01, wireless link 02, packet transfer apparatus 03, wire line 04, packet network 05, wire link 06, and communication apparatus (B) 07.

The communication apparatus A 01 and communication apparatus B 07 perform packet communication via a pre-established connection. Output packets from one apparatus reach the other apparatus on the other end of the connection via the wireless link 02, packet transfer apparatus 03, wire line 04, packet network 05, and wire link 06. The wireless link 02 is constituted by a downlink 11 for transferring packets from the communication apparatus B 07 to the communication apparatus A 01 and an uplink 12 for transferring packets from the communication apparatus A 01 to the communication apparatus B 07. Note, however, that the wireless link 02 is an example, and a wire link may be used as long as a packet from the packet transfer apparatus 03 reaches the communication apparatus A 01 in one hop. The packet transfer apparatus 03 controls the packet transfer order with respect to the downlink 11. The packet network 05 is a network through which packets pass.

Figure 2:
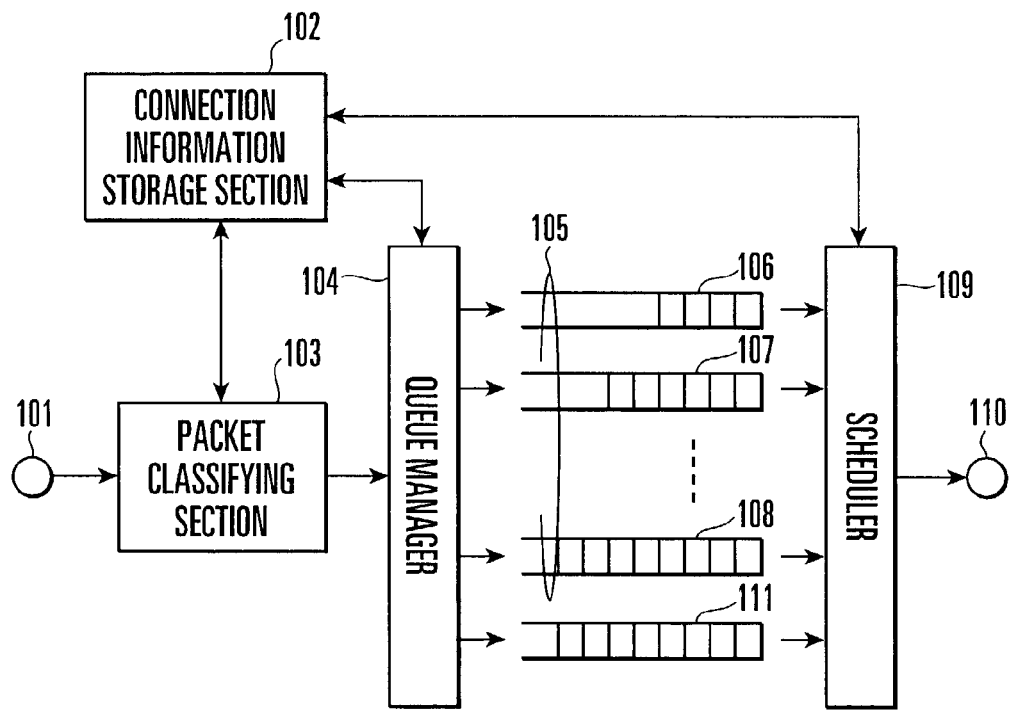
FIG. 2 is a function block diagram of the packet transfer apparatus shown in FIG. 1.

As shown in FIG. 2, the packet transfer apparatus 03 includes an input terminal 101, a connection information storage section 102, a packet classifying section 103, a queue manager 104, a queue set 105 including queues 106 to 108, a scheduler 109, an output terminal 110, and a default queue 111.

The input terminal 101 receives a packet input to the packet transfer apparatus 03 and transmits the received packet to the packet classifying section 103. The connection information storage section 102 holds information for connection management, e.g., the identifier of a connection, and performs registration, updating, referencing, and deletion of information from the packet classifying section 103.

The packet classifying section 103 identifies a connection by analyzing the header of the input packet. Upon detection of the establishment of the connection, the packet classifying section 103 registers the corresponding information in the connection information storage section 102. Upon detection of the release of the connection, the packet classifying section 103 deletes the corresponding information in the connection information storage section 102. If the connection is known, the packet classifying section 103 refers to the connection information storage section 102 to transfer the received packet to the queue manager 104, together with the queue identifier of the corresponding queue. The queue manager 104 stores the packet received from the packet classifying section 103 in the corresponding queue in accordance with the queue identifier. In this case, the packet may be dropped, as needed.

The queue set 105 is constituted by a plurality of queues 106 to 108 prepared for the respective connections. The default queue 111 serves to store, for example, packets using transport layer protocols other than TCP. The scheduler 109 selects one of the queues 106 to 108 belonging to the queue set 105 and default queue 111 and extract/transmit a packet from the head of the queue to the output terminal 110. The output terminal 110 transmits the packet received from the scheduler 109 to a network.

Figure 3:
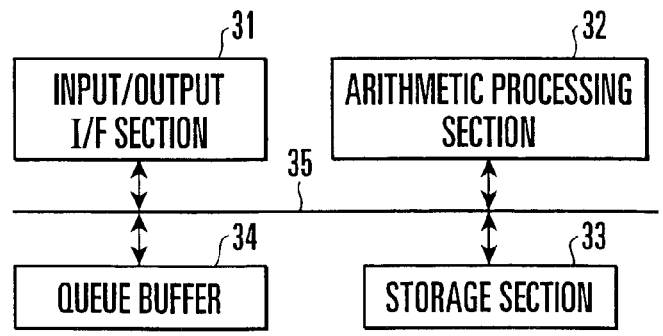
FIG. 3 is a block diagram showing an arrangement obtained by implementing the packet transfer apparatus in FIG. 1 using a computer.

As shown in FIG. 3, the packet transfer apparatus 03 is formed from a computer which executes various processes by the stored program method. An input/output I/F (interface) section 31 has the input terminal 101 and output terminal 110 and exchanges packets with external units. An arithmetic processing section 32 is constituted by a microprocessor such as a CPU and its peripheral circuits and implements the respective functional means, i.e., the packet classifying section 103, queue manager 104, and scheduler 109 by loading predetermined programs and executing various processing control operations. A storage section 33 is a memory which implements the connection information storage section 102 and stores various kinds of information and programs used for the processing in the arithmetic processing section 32. A queue buffer 34 is a buffer memory which implements the queues 106 to 108 and default queue 111. The input/output I/F section 31, arithmetic processing section 32, storage section 33, and queue buffer 34 are connected to each other via a bus 35.

A general packet transfer procedure using a TCP connection will be described next with reference to FIG. 4. TCP has the following connection establishment phase, data transmission/reception phase, and connection release phase. The connection establishment phase begins with the transmission of a packet in which a SYN flag is set. Operation may begin with either the communication apparatus (A) 01 or the communication apparatus (B) 07. Assume that in this case, operation begins with the communication apparatus A.

First of all, a packet P01 as a connection establishment request in which a SYN flag is set is transmitted from the communication apparatus A. This packet P01 contains the IP addresses and port numbers of the communication apparatuses A and B which are to be used for the subsequent connection. The packet P01 is received/transferred by the packet transfer apparatus 03 and received by the communication apparatus B. Upon reception of the packet P01, the communication apparatus B transmits a packet P02 in which a SYN flag and ACK flag are set. The packet P02 is received by the communication apparatus A through packet transfer processing P03 in the packet transfer apparatus. In response to this packet P02, the communication apparatus A transmits a packet P04 in which an ACK flag is set. The packet P04 is received by the communication apparatus B via the packet transfer apparatus. With the above operation, TCP connection establishment is completed.

After the connection is established in this manner, data communication in the data transmission/reception phase is executed by transmitting a packet from the established home IP address port to the established remote IP address port. A data packet P05 transmitted from the communication apparatus B is received by the communication apparatus A through data communication processing P06 in the packet transfer apparatus.

The connection release phase begins with the transmission of a packet in which a FIN flag is set. Operation may begin with either the communication apparatus A or the communication apparatus B. Assume that in this case, operation begins with the communication apparatus B. First of all, the communication apparatus B transmits a packet P07 as a connection release request in which a FIN flag is set. The packet P07 is received by the communication apparatus A through connection release processing P08 in the packet transfer apparatus 03. Upon reception of the packet P07, the communication apparatus A transmits a packet P09 in which FIN and ACK flags are set. The packet P09 is received by the communication apparatus A via the packet transfer apparatus. In response to the packet P09, the communication apparatus B transmits a packet P10 in which an ACK flag is set. The packet P10 is received by the communication apparatus A via the packet transfer apparatus. With the above operation, the TCP connection release phase is terminated.

The operation of the above packet transfer apparatus will be described next with reference to FIG. 2. The following description will exemplify the case wherein the packet transfer apparatus 03 is installed between the communication apparatus A and the communication apparatus B as shown in FIG. 1, and data is to be transmitted from the communication apparatus B to the communication apparatus A as shown in FIG. 4. In consideration of communication between the communication apparatuses A and B, the present invention can be applied to one-way data transmission from the communication apparatus A to the communication apparatus B, one-way data transmission from the communication apparatus B to the communication apparatus A, and two-way data transmission between the communication apparatuses A and B.

Figure 4:
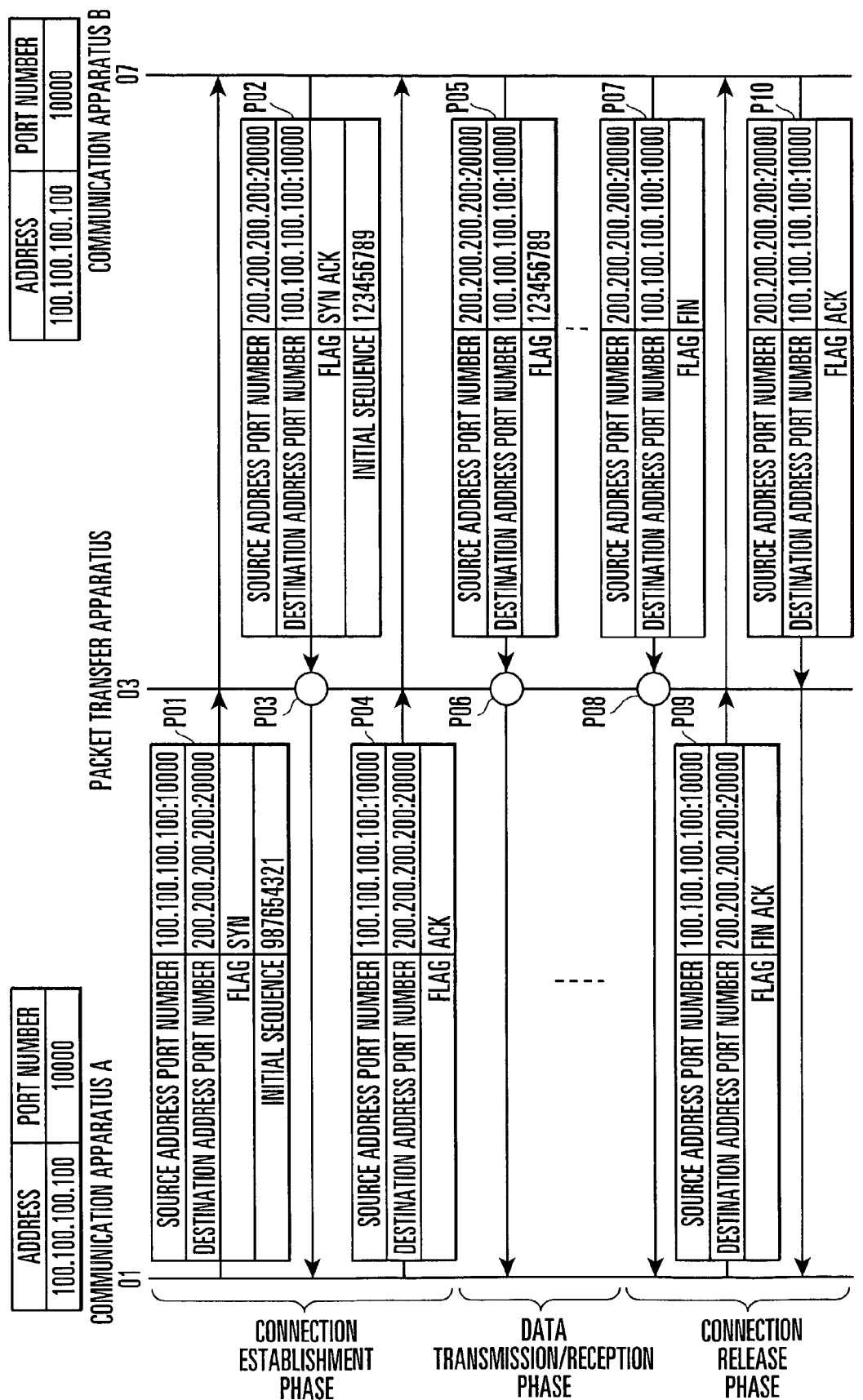
FIG. 4 is a sequence chart showing a packet transfer procedure in a TCP connection.

Connection establishment processing (FIG. 4: P03) in the TCP connection establishment procedure will be described first. In the packet transfer apparatus 03, when a packet is input to the input terminal 101, the packet classifying section 103 analyzes the header information of the packet. As a result of header analysis, it is determined that a connection establishment packet in which a SYN flag is set in the TCP header portion, which is transmitted from the communication apparatus B to the communication apparatus A, is received in the TCP connection establishment procedure. In this case, the packet classifying section 103 registers, in the connection information storage section 102, new connection information having a set of source and destination address port numbers and information having transmission data amount set to 0, and sends a packet to the queue manager 104, together with a request to generate a new queue.

Figures 5, 6:
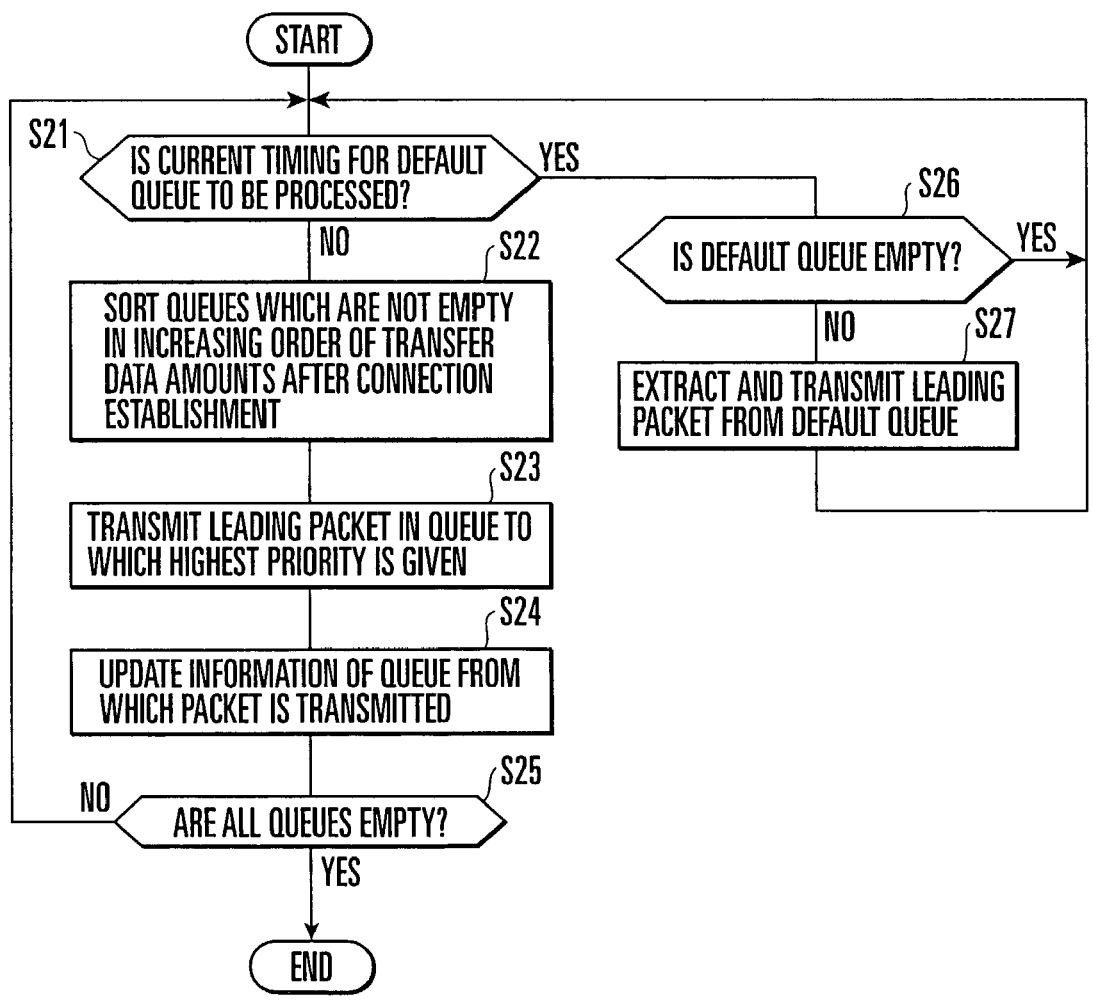
FIG. 5 is a view showing an example of information for each connection which is stored in the connection information storage section shown in FIG. 2.
FIG. 6 is a flow chart showing packet transfer control processing by the packet transfer apparatus shown in FIG. 2.

FIG. 5 shows an example of information stored in the connection information storage section 102 for each connection. Referring to FIG. 5, in order to sort data in the scheduler according to transfer data amount, the corresponding information is held for each connection. However, information concerning the amount of variation in transfer rate over time, an elapsed time after connection establishment, or the like may be held instead. Upon reception of the packet together with the queue generation request from the packet classifying section 103, the queue manager 104 generates a new queue, adds the information of the queue identifier to the corresponding connection in the connection information storage section 102, and stores the packet in the generated queue.

Data transmission/reception processing (FIG. 4: P06) in the TCP transmission/reception phase will be described next. In the packet transfer apparatus 03, when a packet is input to the input terminal 101, the packet classifying section 103 analyzes the header information of the packet. When it is determined as a result of the header analysis that a data packet has been received, the packet classifying section 103 inquires of the connection information storage section 102 by using a set of source and destination address port numbers as a key to obtain the identifier of a queue in which the packet should be stored. Thereafter, the packet is sent to the queue manager 104, together with the queue identifier. Upon reception of the packet together with the queue identifier from the packet classifying section 103, the queue manager 104 stores the packet in the corresponding queue in accordance with the queue identifier.

Connection release processing (FIG. 4: P08) in the TCP connection release phase will be described next. In the packet transfer apparatus 03, when a packet is input to the input terminal 101, the packet classifying section 103 analyzes the header information of the packet. If it is determined as a result of the header analysis that a connection release packet having a FIN flag set in the TCP header portion has been received, which is sent from the communication apparatus B to the communication apparatus A in the TCP connection release procedure, the packet classifying section 103 obtains the identifier of a queue in which the packet should be stored from the connection information storage section 102 by using a set of source and destination address port numbers as a key.

At the same time, the packet classifying section 103 requests the connection information storage section 102 to erases the corresponding registered information. The connection information storage section 102 erases the corresponding connection information after a lapse of a predetermined period of time. Thereafter, the packet is sent to the queue manager 104, together with the queue identifier and a queue delete request. Upon reception of the packet together with the queue identifier and queue delete request from the packet classifying section 103, the queue manager 104 stores the packet in the corresponding queue in accordance with the queue identifier. The queue manager 104 deletes the queue a predetermined period of time after the packet is transmitted from the queue.

If it is determined as a result of the header analysis that a packet using a protocol such as UDP, other than TCP, as a transport layer protocol has been received, the packet is stored in the default queue 111 prepared in advance, and a band is ensured independently of the TCP connection, thereby processing the queue. The connection information storage section 102 holds timers for the respective connections for the case of abnormal ends of TCP connections, and deletes connection information if no packet is input in a predetermined period of time. With the above processing, the input packet is added to one of the queues 106 to 108 for the respective connections.

The scheduler 109 selects one of the queues 106 to 108 in the queue set 105 by referring to the connection information obtained from the connection information storage section 102, and outputs a packet in the queue to the network toward the communication apparatus A via the output terminal 110. The scheduler 109 continues the processing of transmitting a packet from the output terminal 110 and then selecting and transmitting the next transmission packet until all the queues in the queue set 105 become empty.

Packet transfer control processing (queue selection processing) in the scheduler 109 by using a transfer data amount after connection establishment as a selection condition will be described next with reference to FIG. 6. The default queue and queues for the respective connections are processed at the timings respectively assigned to the queues. When selecting a packet to be transferred next after packet transfer is completed at the output terminal 110, the scheduler 109 checks whether the current timing is for the default queue to be processed (step S21).

If it is determined that the current timing is for the default queue to be processed, it is checked whether the default queue is empty (step S26). If the queue is empty, the flow immediately returns to step S21. If the queue is not empty, the leading packet in the default queue is transmitted (step S27), and the flow returns to step S21 again.

If it is determined in step S21 that the current timing is not for the default queue to be processed, all the queues in the queue set 105 which are not empty are sorted in increasing order of the transfer data amounts (the numbers of packets or real data amounts) upon connection establishment (step S22). The highest priority is given to a queue, of the queues sorted in the order of the transfer data amounts, which has a connection with the smallest transfer data amount, and the leading packet in this queue is transmitted (step S23). The transfer data amount of the connection information held by the connection information storage section 102 is then updated, including the information of the transferred packet (step S24).

Subsequently, it is checked whether all the queues in the queue set 105 are empty (step S25). If all the queues are not empty, the flow returns to the processing in step S21 again. If all the queues are empty, the series of packet transfer control operations is terminated. The above description has exemplified the case wherein the transfer data amount after connection establishment is used as a selection condition in the priority transfer control done by the scheduler 109. However, an elapsed time after connection establishment may also be used as another selection condition.

Figure 7:
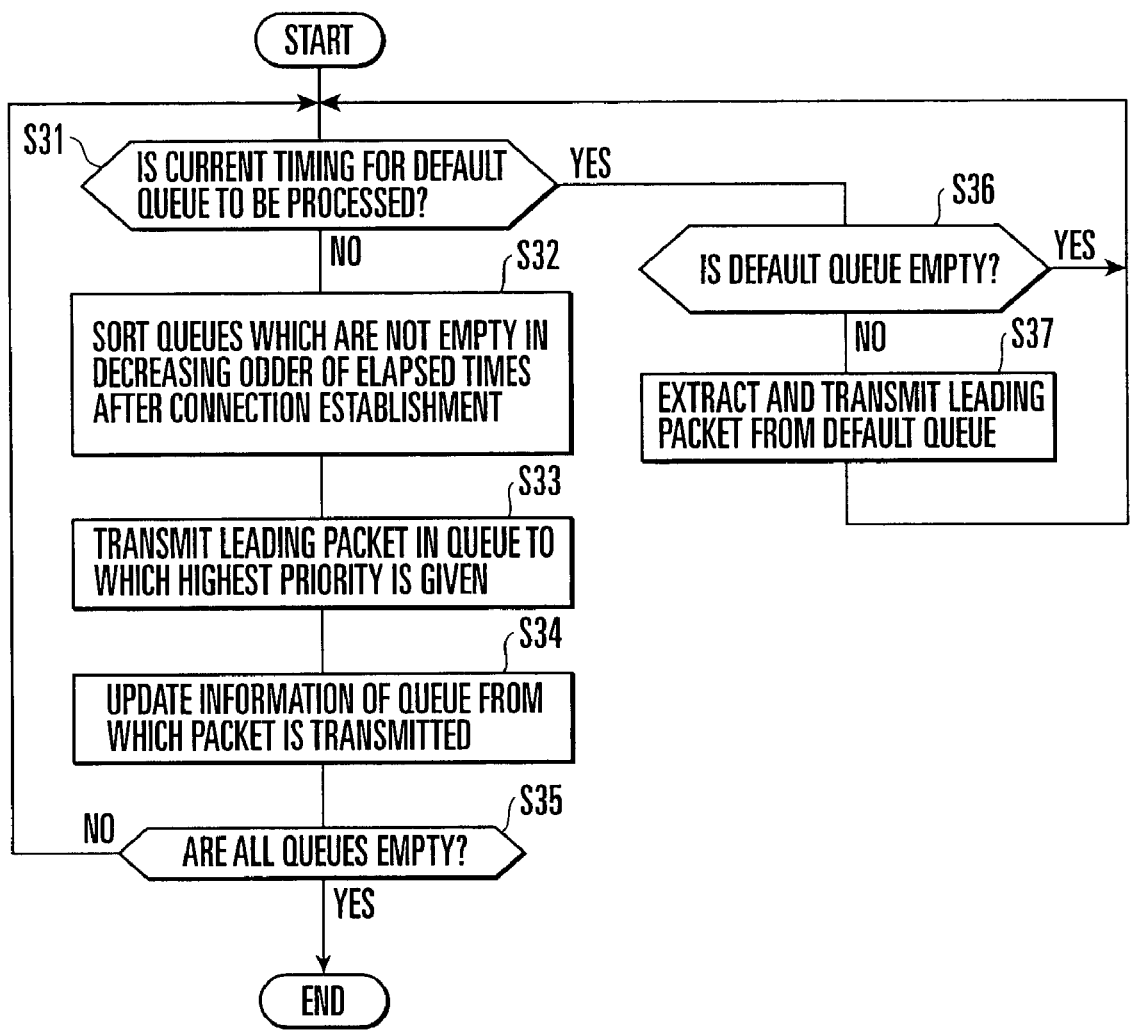
FIG. 7 is a flow chart showing another packet transfer control processing by the packet transfer apparatus shown in FIG. 2.

A case wherein an elapsed time after connection establishment is used as a selection condition will be described next with reference to FIG. 7. In this case, the connection information storage section 102 needs to store the elapsed time after the establishment of each connection. The default queue and queues for the respective connections are processed at the timings respectively assigned to the queues.

First of all, when packet transfer is terminated at the output terminal 110 and a packet to be transferred next is to be selected, the scheduler 109 checks whether the current timing is for the default queue to be processed (step S31). If the current timing is for the default queue to be processed, the scheduler 109 checks whether the default queue is empty (step S36). If the default queue is empty, the flow immediately returns to step S31. If the default queue is not empty, the scheduler 109 transmits the leading packet in the default queue (step S37), and the flow returns to step S31 again.

If it is determined in step S31 that the current timing is not for the default queue to be processed, all the queues in the queue set 105 which are not empty are sorted in increasing order of the elapsed times after connection establishment (step S32). The highest priority is then given to a queue, of the queues sorted in the order of the elapsed times after connection establishment, which has a connection with the shortest elapsed time after connection establishment, and the leading packet in this queue is transmitted (step S33).

Subsequently, the elapsed time after connection establishment which is contained in the connection information held by the connection information storage section 102 is updated, including the information of the transferred packet (step S34). It is then checked whether all the queues in the queue set 105 are empty (step S35). If all the queues are not empty, the flow returns to step S31 again. If all the queues are empty, the series of packet transfer control operations is terminated. Note that in the priority transfer control done by the scheduler 109, the amount of change in transfer rate over time may be used as a selection condition.

Figure 8:
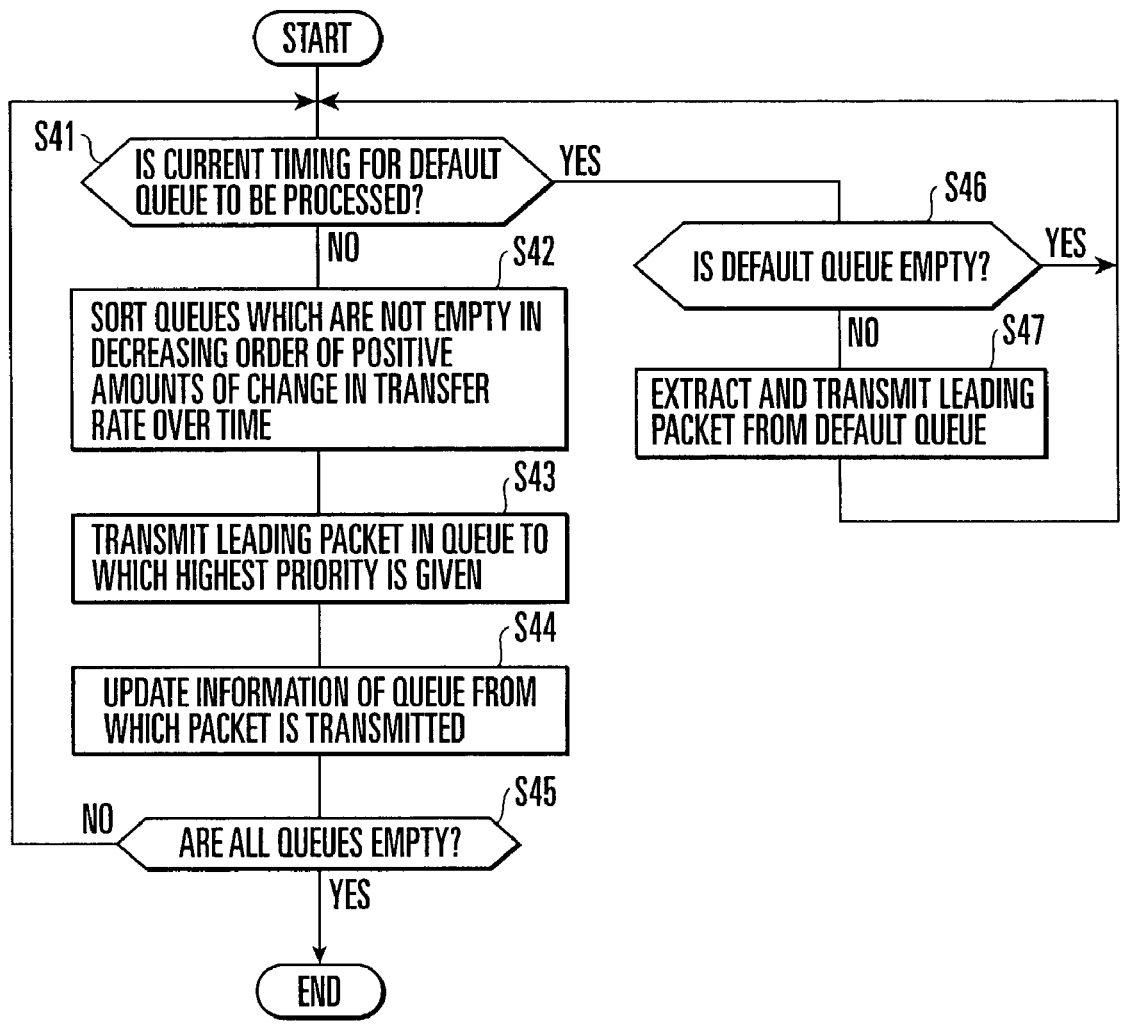
FIG. 8 is a flow chart showing still another packet transfer control by the packet transfer apparatus shown in FIG. 2.

A case wherein the amount of change in transfer rage over time is used as a selection condition will be described next with reference to FIG. 8. In this case, the connection information storage section 102 needs to store the amount of change in transfer rate over time for each connection. The default queue and queues for the respective connections are processed at the timings respectively assigned to the queues.

When packet transfer is completed at the output terminal 110 and a packet to be transferred next is to be selected, the scheduler 109 checks whether the current timing is for the default queue to be processed (step S41). If the current timing is for the default queue to be processed, the scheduler 109 checks whether the default queue is empty (step S46). If the default queue is empty, the flow returns to step S41. if the default queue is not empty, the leading packet in the default queue is transmitted (step S47), and the flow returns to step S41 again.

If it is determined in step S41 that the current timing is for the default queue to be processed, all the queues in the queue set 105 which are not empty are sorted according to the amounts of changes in transfer rate over time (step S42). The highest priority is given to a queue, of the queues sorted in the order of the amounts of changes in transfer rate over time, which has a connection with the largest positive amount of change in transfer rate over time, i.e., a queue with the transfer rate increases in the largest steps, and the leading packet in this queue is transmitted (step S43).

The amount of change in transfer rate over time which is contained in the connection information held by the connection information storage section 102 is updated, including the information of the transferred packet (step S44). It is then checked whether all the queues in the queue set 105 are empty (step S45). If all the queues are not empty, the flow returns to the processing in step S31 again. If all the queues are empty, the series of packet transfer control operations is terminated.

As described above, according to this embodiment, the packet classifying section 103 identifies a connection to be used for data transfer between a transmission terminal and a reception terminal on the basis of at least one field contained in the header of a reception packet received from the transmission terminal, and detects the establishment and release of the connection. Thereafter, the scheduler 109 preferentially transfers the reception packet with a connection, of the respective connections identified by the packet classifying section 103, which exhibits the smallest data amount of reception packet transferred after connection establishment.

In addition, the queue manager 104 sequentially stores the reception packets in the queues 106 to 108 corresponding to the respective connections identified by the packet classifying section 103. The scheduler 109 then selects a connection through which the reception packet is to be transferred next. In this case, the scheduler 109 preferentially transfers a reception packet corresponding to a connection, of the respective connections, which exhibits the small data amount of reception packet transferred after connection establishment, a connection exhibiting a short elapsed time after connection establishment, or a connection exhibiting a large positive change in transfer rate over time.

With this operation, a high priority is given to a packet at the time of slow start operation of a TCP connection, and hence the fairness between TCP connections with different transfer data sizes can be improved without the constraints of the amounts of data transferred through the respective connections. TCP slow start operation, in particular, is suitable as operation to be done by a terminal on the transmission side to avoid congestion in the network. Even if a packet associated with a connection during slow start operation is preferentially output, no congestion is caused at an edge router located nearest to the terminal which receives data.

In the packet transfer apparatus between communication apparatuses, therefore, the priority control scheme of giving a high priority to a packet at the time of TCP connection slow start operation is performed to shorten the wait time in the packet transfer apparatus between the instant at which a packet is input and the instant at which the packet is output, thereby improving the throughput of connections exhibiting small transfer data sizes.

Even if queues are not prepared for the respective connections in the queue set 105, and priority control is not performed by the scheduler 109, the same function and effect as those described above can be obtained by making the queue manager 104 increase the packet drop ratio in a connection with a large data transfer amount, a connection exhibiting a negative, 0, or positive small change in transfer rate over time, or a connection exhibiting a long elapsed time after connection establishment.

More specifically, the queue manager 104 may properly drop packets when packets arrive. For example, the packet drop probability may be increased as the transfer data amount increases with reference to the connection information obtained from the connection information storage section 102. Alternatively, packets may be dropped according to an arbitrary algorithm such as RED, e.g., increasing the packet drop probability as the change in data flow rate becomes negative or positive small, increasing the packet drop probability as the elapsed time after connection establishment prolongs, or unconditionally dropping an input packet when a memory shortage occurs.

A packet transfer apparatus according to the second embodiment of the present invention will be described next with reference to FIG. 9.

The packet transfer apparatus according to this embodiment includes an input terminal 201, a connection information storage section 202, a packet classifying section 203, a queue manager 204, a priority group 205 including queues 207 and 208, a non-priority group 206 including queues 209 and 210, a default queue 216, a scheduler 211, and an output terminal 215. Note that the packet transfer apparatus shown in FIG. 9 has the same control arrangement as that shown in FIG. 3, and hence a description thereof will be omitted.

The input terminal 201 receives a packet input to a packet transfer apparatus 03, and transmits the reception packet to the packet classifying section 203. The connection information storage section 202 holds information for connection management, e.g., the identifier of a connection, and performs registration, updating, referencing, and deletion of information from the packet classifying section 203. The packet classifying section 203 identifies a connection by analyzing the header of the input packet and performs registration, deletion, referencing, or updating of a connection to the connection information storage section 202. The packet classifying section 203 then transfers the reception packet to the queue manager 204, together with the information of the connection.

The queue manager 204 stores the packet received from the packet classifying section 203 in a queue. In this case, unnecessary packets are dropped. The priority group 205 includes the queues 207 and 208 which exist for the respective connections. The non-priority group 206 includes the queues 209 and 210 which exist for the respective connections. In this case, the queues are formed into two groups. However, they may be formed into an arbitrary number of groups.

The default queue 216 stores, for example, a packet using a protocol other than TCP as a transport layer protocol. The scheduler 211 includes first schedulers 212 and 213 and second scheduler 214. The first schedulers 212 and 213 sort the queues for the respective connections in the priority group 205 and non-priority group 206 and transfer the sorted queues to the second scheduler 214. The second scheduler 214 selects a queue from which the packet should be transmitted from the first schedulers 212 and 213 or default queue 216, and transmits the packet. The output terminal 215 transmits the packet received from the scheduler 211 to a network.

The operation of the packet transfer apparatus having the above arrangement will be described next with reference to FIG. 9. The following description will exemplify the case wherein the packet transfer apparatus 03 is installed between a communication apparatus (A) 01 and a communication apparatus (B) 07 as shown in FIG. 1, and data is transmitted from the communication apparatus B to the communication apparatus A as shown in FIG. 4.

Connection establishment processing (FIG. 4: P03) in a TCP connection establishment procedure will be described first. In the packet transfer apparatus 03, when a packet is input to the input terminal 201, the packet classifying section 203 analyzes the header information of the packet. If it is determined as a result of the header analysis that a connection establishment packet in which a SYN flag is set in the TCP header portion which is sent from the communication apparatus B to the communication apparatus A has been received during the TCP connection establishment procedure, the packet classifying section 203 registers, in the connection information storage section 202, new connection information having a set of source and destination address port numbers and information with a transfer data amount being set to "0", and sends the packet to the queue manager 204, together with a request to generate a new queue.

Figures 9, 10:
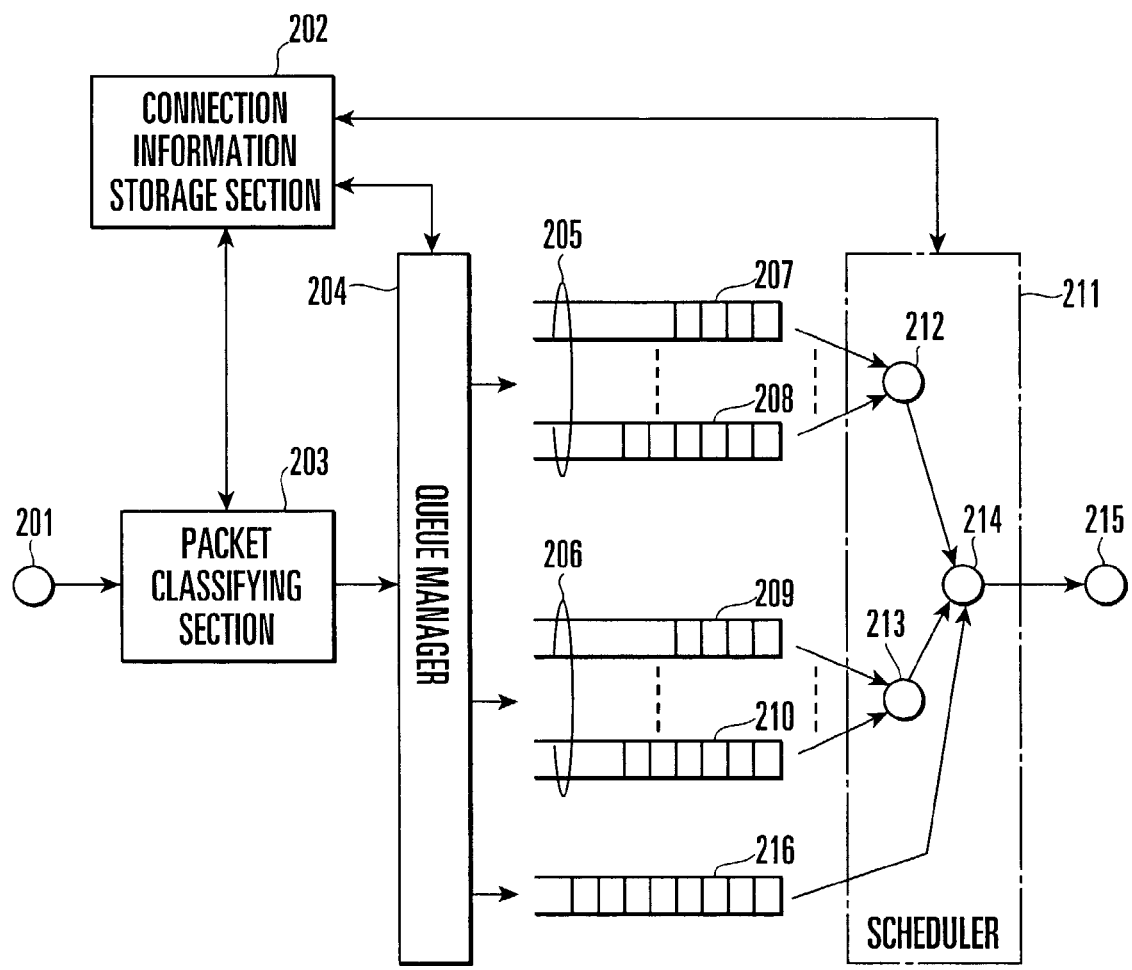
FIG. 9 is a block diagram showing a packet transfer apparatus according to the second embodiment of the present invention.
FIG. 10 is a view showing an example of connection information stored in the connection information storage section shown in FIG. 9.

FIG. 10 shows an example of information for each connection which is stored in the connection information storage section 202. Referring to FIG. 10, in order to sort data in the scheduler according to transfer data amount, the corresponding information is held for each connection. However, information concerning the amount of variation in transfer rate over time, an elapsed time after connection establishment, or the like may be held instead.

Upon reception of the packet together with the queue generation request from the packet classifying section 203, the queue manager 204 generates a new queue and stores the packet in it. The queue manager 204 then incorporates the queue in the priority group 205 in which the transfer data amount is less than 100 Kbytes. Thereafter, a queue identifier and information indicating that the queue belongs to the priority group is added to the connection information held by the connection information storage section 202.

Data transmission/reception processing (FIG. 4: P06) in the TCP data transmission/reception phase will be described next. In the packet transfer apparatus 03, when a packet is input to the input terminal 201, the packet classifying section 203 analyzes the header information of the packet. If it is determined as a result of the header analysis that a data packet has been received, the packet classifying section 203 inquires of the connection information storage section 202 by using a set of source and destination address port numbers as a key to obtain the identifier of a queue in which the packet should be stored. Thereafter, the packet classifying section 203 sends the queue identifier and packet to the queue manager 204. Upon reception of the queue identifier and packet from the packet classifying section 203, the queue manager 204 stores the packet in the corresponding queue in accordance with the queue identifier.

Connection release processing (FIG. 4: P08) in the TCP connection release phase will be described next. In the packet transfer apparatus 03, when a packet is input to the input terminal 201, the packet classifying section 203 analyzes the header information of the packet. If it is determined as a result of the header analysis that a connection release packet having a FIN flag set in the TCP header portion has been received, which is sent from the communication apparatus B to the communication apparatus A in the TCP connection release procedure, the packet classifying section 203 obtains the identifier of a queue in which the packet should be stored from the connection information storage section 202 by using a set of source and destination address port numbers as a key.

At the same time, the packet classifying section 203 requests the connection information storage section 202 to erase the corresponding registered information. The connection information storage section 202 erases the connection information after a lapse of a predetermined period of time. The packet is then sent to the queue manager 204, together with the queue identifier and queue delete request. Upon reception of the packet together with the queue identifier and queue delete request from the packet classifying section 203, the queue manager 204 stores the packet in the corresponding queue in accordance with the queue identifier. The queue manager 204 deletes the queue a predetermined period of time after the packet is transmitted from the queue.

If it is determined as a result of the header analysis that a packet using a protocol such as UDP, other than TCP, as a transport layer protocol has been received, the packet is stored in the default queue 216 prepared in advance, and this queue is processed by ensuring a band independently of the TCP connection. The connection information storage section 202 holds timers for the respective connections for the case of abnormal ends of TCP connections, and deletes connection information if no packet is input in a predetermined period of time.

When packets arrive, the queue manager 204 may properly drop packets. For example, the packet drop probability may be increased as the transfer data amount increases with reference to the connection information obtained from the connection information storage section 202. Alternatively, packets may be dropped according to an arbitrary algorithm such as RED, e.g., increasing the packet drop probability as the change in data flow rate becomes negative or positive small, increasing the packet drop probability as the elapsed time after connection establishment prolongs, or unconditionally dropping an input packet when a memory shortage occurs. The input packet is added to one of the queues 207 to 210 prepared for the respective connections through the above processing.

The scheduler 211 selects one of the queues 207 to 210 with reference to the connection information obtained from the connection information storage section 202, and outputs a packet in the queue to the network toward the communication apparatus A via the output terminal 215. When the output terminal 215 completely transmits the packet, the scheduler 211 selects the next transmission packet and transmits it. The scheduler 211 continues this processing until all the queues in the queue set become empty.

Figure 11:
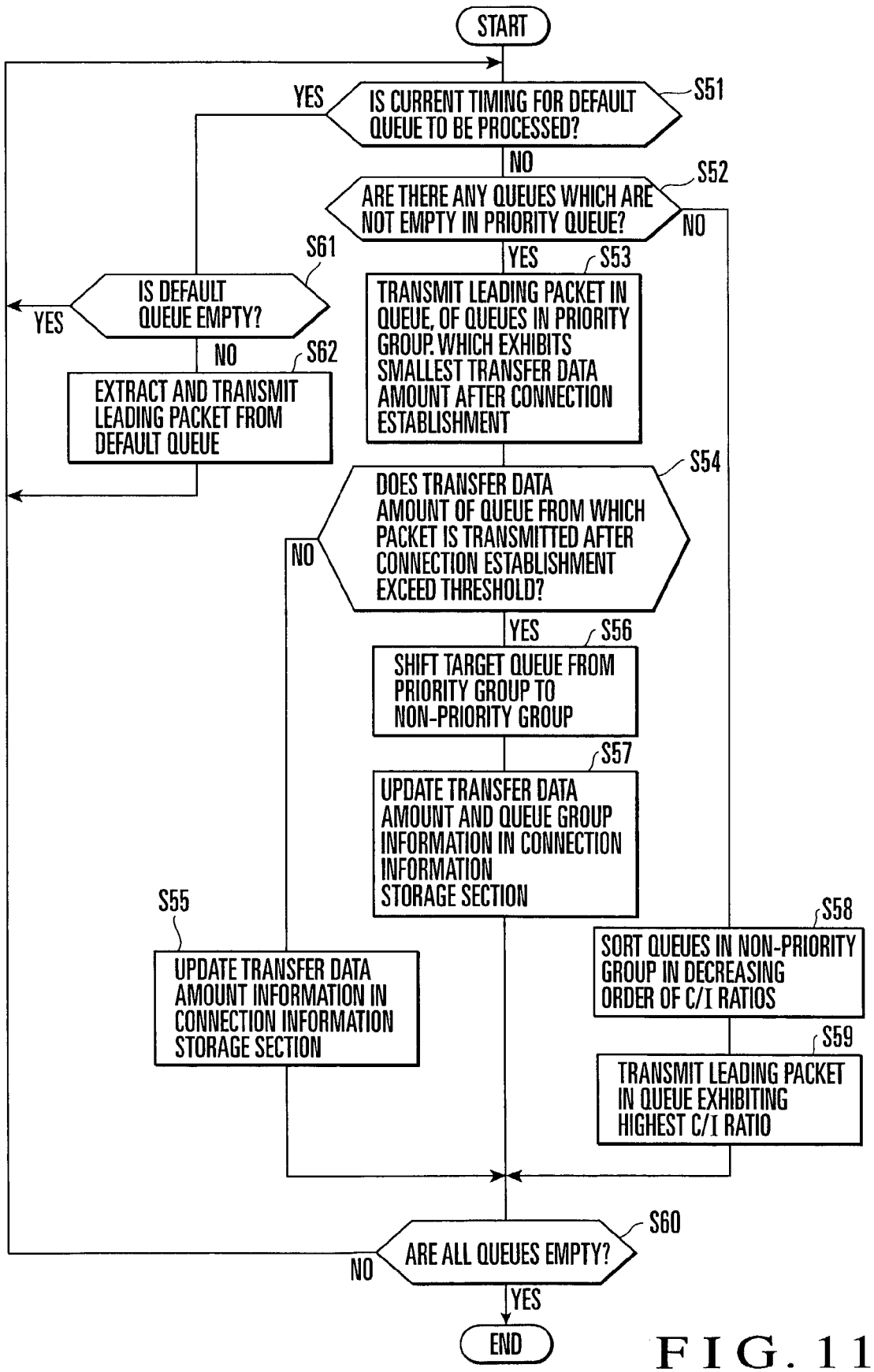
FIG. 11 is a flow chart showing packet transfer control processing by the packet transfer apparatus shown in FIG. 9.

Packet transfer control processing (queue selection processing) to be done by the scheduler 211 when a transfer data amount after connection establishment is used as a selection condition will be described next with reference to FIG. 11. The default queue and queues for the respective connections are processed at the timings respectively assigned to the queues. When packet transfer at the output terminal 215 is completed and a packet to be transferred next is to be selected, the scheduler 211 checks whether the current timing is for the default queue to be processed (step S51).

If the current timing is for the default queue to be processed, the scheduler 211 checks whether the default queue is empty (step E11). If the default queue is empty, the flow immediately returns to step S51. If the default queue is not empty, the leading packet in the default queue is transmitted (step E12), and the flow returns to step S51 again.

If it is determined in step S51 that the current timing is not for the default queue to be processed, the second scheduler 214 checks whether there is any queue that is not empty in the priority group 205 (step S52). If such a queue is present, the non-priority group 206 is selected. If no such queue is present, the non-priority group 206 is selected. In this case, if a queue that is not empty exists in the priority group, a queue in the priority group is always processed. However, selection of the priority group 205 and non-priority group 206 may be done by an arbitrary algorithm.

If the second scheduler 214 selects the non-priority group 206 in step S52, the first scheduler 213 sorts the queues in the non-priority group 206 in the order in which the propagation states of wireless links to the destination communication apparatus become worse (step S58). In this case, for example, a C/I ratio (Carrier to Interference Ratio) is used as a sorting index which represents the propagation state of each wireless link Note, however, that an arbitrary algorithm may be used for sorting. After sorting, the leading packet in a queue having the highest C/I ratio is transmitted (step S59).

If the second scheduler 214 selects the priority group in step S52, the first scheduler 212 transmits the leading packet in a queue exhibiting the smallest transfer data amount after connection establishment (step S53). It is then checked whether the transfer data amount of the queue from which the packet is transmitted exceeds 100 Kbytes, which is a threshold for the priority group and non-priority group (step S54). Note, however, that this threshold may be arbitrarily set.

If the transfer data amount does not exceed 100 Kbytes, the transfer data amount in the connection information storage section 202 is updated (step S55). If the transfer data amount exceeds 100 Kbytes, the target queue is shifted to the non-priority group 206 (step S56), and the queue group information is changed to that of the non-priority group in addition to updating of the transfer data amount in the connection information storage section 202 (step S57).

After the transmission of the packet is completed in this manner, it is checked whether all the queues 207 to 210 are empty (step S60). If all the queues are not empty, the flow returns to the processing in step S51 again. If all the queues are empty, the series of packet transfer control operations is terminated. The above description has exemplified the case wherein the transfer data amount after connection establishment is used as a selection condition in priority transfer control in the encoding sequence control unit 209. The elapsed time after connection establishment may be used as another selection condition.

Figure 12:
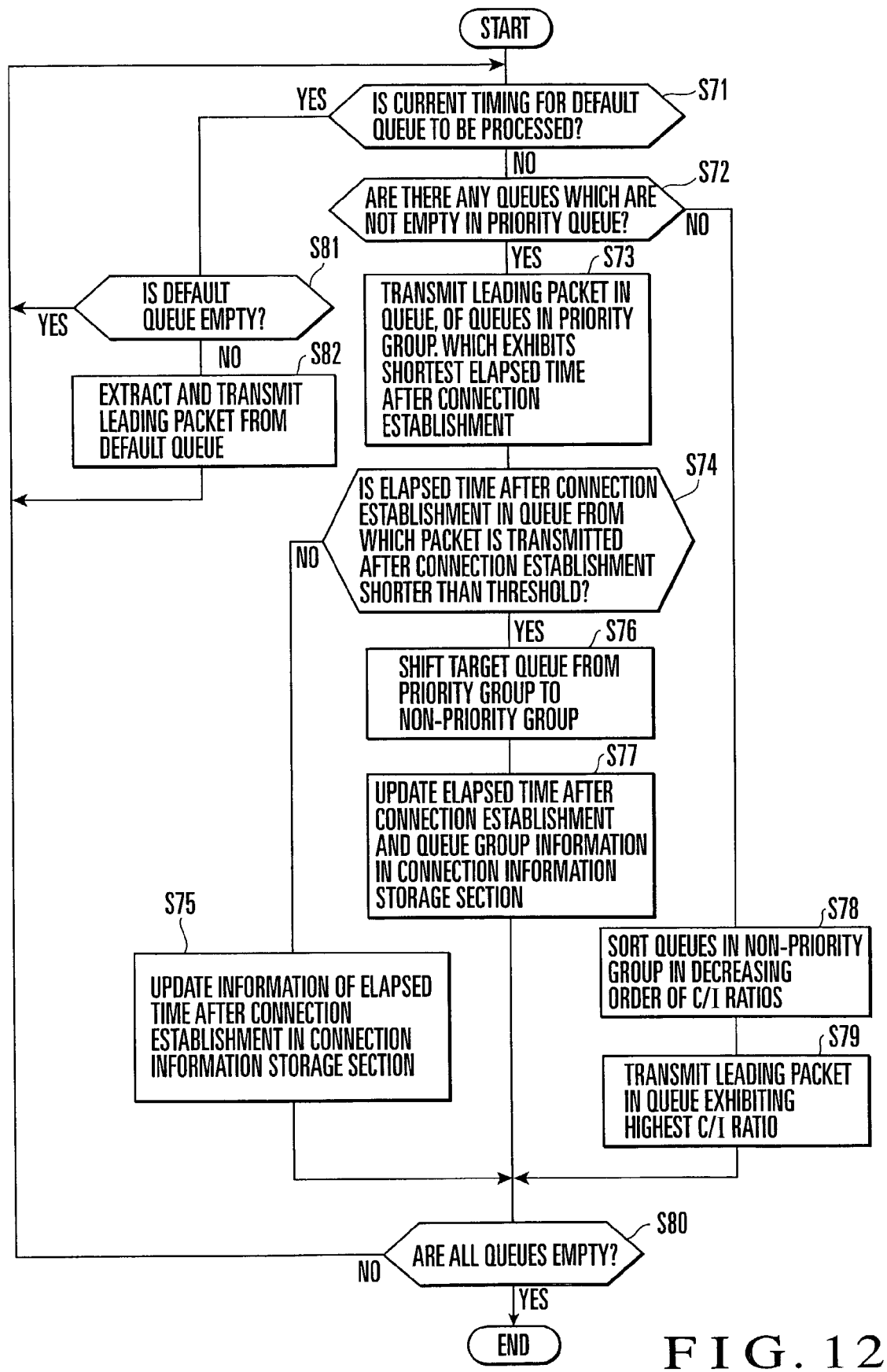
FIG. 12 is a flow chart showing another packet transfer control processing by the packet transfer apparatus shown in FIG. 9.

A case wherein the elapsed time after connection establishment is used as a selection condition will be described next with reference to FIG. 12. In this case, the connection information storage section 202 needs to store the elapsed time after connection establishment for each connection. The default queue and queues for the respective connections are processed at the timings respectively assigned to the queues.

When packet transfer is completed at the output terminal 215 and a packet to be transferred next is to be selected, the scheduler 211 checks whether the current timing is for the default queue to be processed (step S71). If the current timing is for the default queue to be processed, the scheduler 211 checks whether the default queue is empty (step S81). If the default queue is empty, the flow immediately returns to step S71. If the default queue is not empty, the scheduler 211 transmits the leading packet in the default queue (step S82), and the flow returns to step S71 again.

If it is determined in step S71 that the current timing is not for the default queue to be processed, the second scheduler 214 checks whether there is any queue that is not empty in the priority group 205 (step S72). If such a queue exists, the second scheduler 214 selects the priority group 205. If no such queue exists, the second scheduler 214 selects the non-priority group 206. In this case, if a queue that is not empty exists in the priority group, a queue in the priority group is always processed. However, selection of the priority group 205 and non-priority group 206 may be done by an arbitrary algorithm.

If the second scheduler 214 selects the non-priority group 206 in step S72, the first scheduler 213 sorts the queues in the non-priority group 206 in the order in which the unique propagation states of wireless links to the destination communication apparatus become worse (step S78). In this case, for example, a C/I ratio is used as a sorting index which represents the propagation state of each wireless link Note, however, that an arbitrary algorithm may be used for sorting. After sorting, the leading packet in a queue having the highest C/I ratio is transmitted (step S79).

If the second scheduler 214 selects the priority group in step S72, the first scheduler 212 transmits the leading packet in a queue, of the queues in the priority group 205, which exhibits the shortest elapsed time after connection establishment (step S73). The second scheduler 214 then checks whether the elapsed time after connection establishment for the queue from which the packet was transmitted exceeds 10 s, which is a threshold for the priority group and non-priority group (step S74). Note, however, this threshold may be arbitrarily set.

If the elapsed time after connection establishment is shorter than 10 s, the elapsed time after connection establishment is updated in the connection information storage section 202 (step S75). If the elapsed time is longer than 10 s, the target queue is shifted to the non-priority group 206 (step S76), and the queue group information is changed to that for the non-priority group, in addition to updating of the elapsed time after connection establishment in the connection information storage section 202 (step S77).

After the transmission of the packet is completed in this manner, it is checked whether all the queues 207 to 210 are empty (step S80). If all the queues are not empty, the flow returns to the processing in step S71 again. If all the queues are empty, the series of packet transfer control operations is terminated. The amount of change in transfer rate over time may be used as a selection condition.

Figure 13:
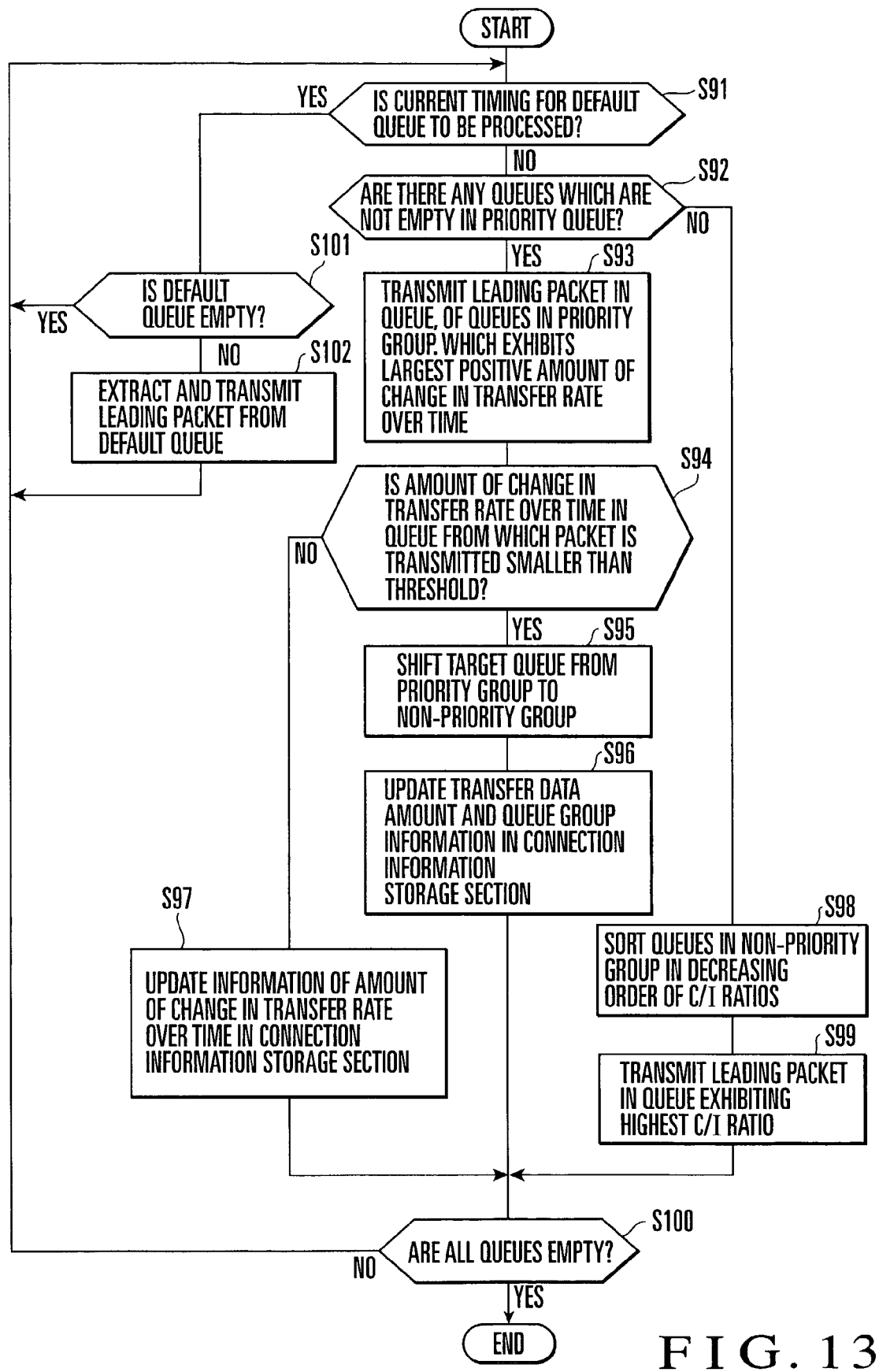
FIG. 13 is a flow chart showing still another packet transfer control processing by the packet transfer apparatus shown in FIG. 9.
Figure 14:
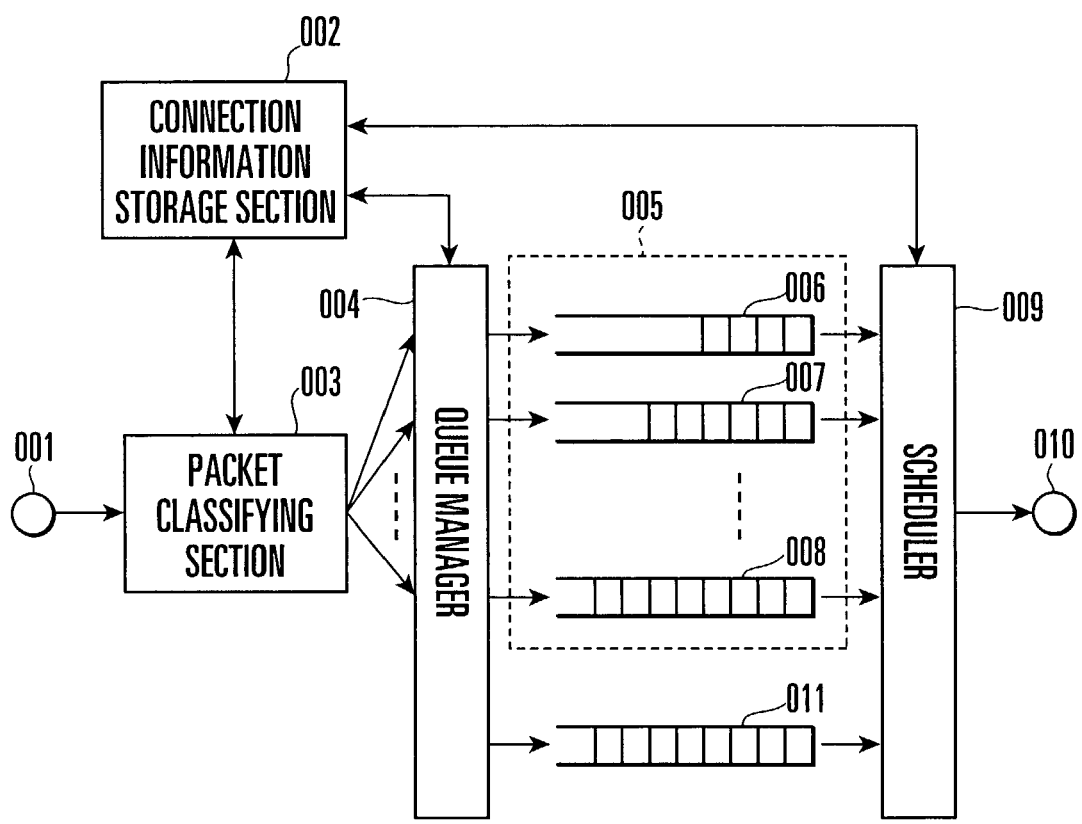
FIG. 14 is a block diagram showing a conventional packet transfer apparatus.
Figure 15:
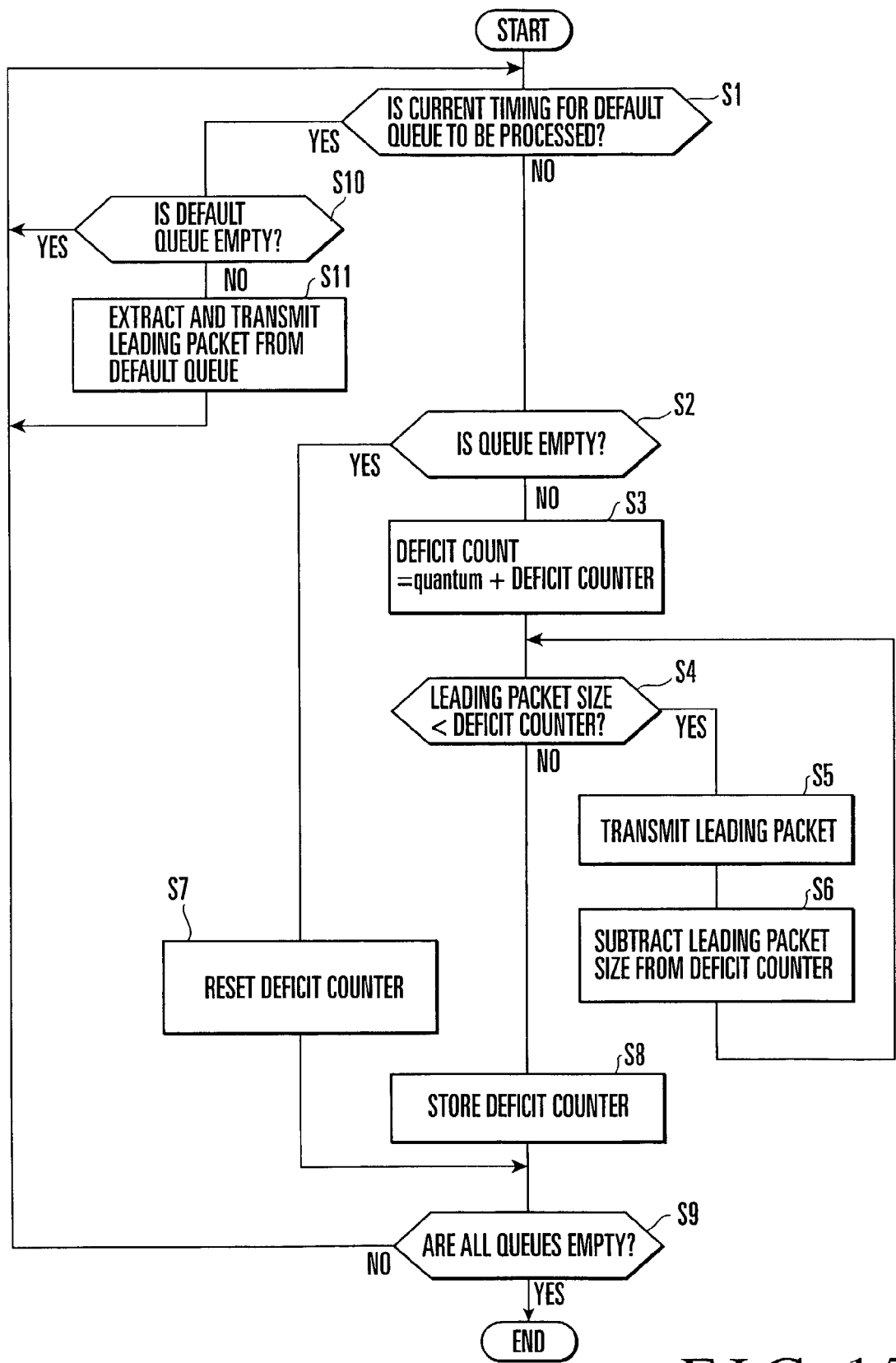
FIG. 15 is a flow chart showing packet transfer control processing by the conventional packet transfer apparatus shown in FIG. 14.

A case wherein the amount of change in transfer rate over time is used as a selection condition will be described next with reference to FIG. 13. In this case, the connection information storage section 202 needs to store the amount of change in transfer rate over time for each connection. The default queue and queues for the respective connections are processed at the timings respectively assigned to the queues.

When packet transfer is completed at the output terminal 215 and a packet to be transferred next is to be selected, the scheduler 211 checks whether the current timing is for the default queue to be processed (step S91). If the current timing is for the default queue to be processed, the scheduler 211 checks whether the default queue is empty (step S101). If the default queue is empty, the flow immediately returns to step S91. If the default queue is not empty, the scheduler 211 transmits the leading packet in the default queue (step S102), and the flow returns to step S91 again.

If it is determined in step S91 that the current timing is not for the default queue to be processed, the second scheduler 214 checks whether there is any queue that is not empty in the priority group 205 (step S92). If such a queue exists, the second scheduler 214 selects the priority group 205. If no such queue exists, the second scheduler 214 selects the non-priority group 206. In this case, if a queue that is not empty exists in the priority group, a queue in the priority group is always processed. However, selection of the priority group 205 and non-priority group 206 may be done by an arbitrary algorithm.

If the second scheduler 214 selects the non-priority group 206 in step S92, the first scheduler 213 sorts the queues in the non-priority group 206 in the order in which the propagation states of wireless links to the destination communication apparatus become worse (step S98). In this case, for example, a C/I ratio is used as a sorting index which represents the propagation state of each wireless link Note, however, that an arbitrary algorithm may be used for sorting. After sorting, the leading packet in a queue having the highest C/I ratio is transmitted (step S99).

If the second scheduler 214 selects the priority group in step S92, the first scheduler 212 transmits the leading packet in a queue, of the queues in the priority group 205, which exhibits the largest amount of change in transfer rate over time (step S93). The second scheduler 214 then checks whether the amount of change in transfer rate of the queue from which the packet is transmitted exceeds 20 kbps/s, which is a threshold for the priority group and non-priority group (step S94). Note, however, this threshold may be arbitrarily set.

If this amount larger than 20 kbps/s, the amount of change in transfer rate over time is updated in the connection information storage section 202 (step S95). If the amount is smaller than 20 kbps/s, the target queue is shifted to the non-priority group 206 (step S96), and the queue group information is changed to that of the non-priority group in addition to updating of the amount of change in transfer rate over time in the connection information storage section 202 (step S97).

After the transmission of the packet is completed in this manner, it is checked whether all the queues 207 to 210 are empty (step S100). If all the queues are not empty, the flow returns to the processing in step S91 again. If all the queues are empty, the series of packet transfer control operations is terminated.

As described above, according to this embodiment, the scheduler 211 classifies the respective connections into a plurality of groups on the basis of the data amounts of reception packets transferred after connection establishment. When a connection for the transfer of a reception packet is to be selected, a connection belonging to a group exhibiting a small data amount is preferentially selected. In addition, connections are classified into a plurality of groups on the basis of the elapsed times after connection establishment or changes in transfer rate over time for the respective connections, and a connection is preferably selected for each group.

According to this embodiment, the same function and effect as those of the first embodiment can be obtained, and connections can be selected fairly in a wide range, i.e., groups, without impartially selecting any specific connections. As in the first embodiment, even if queues are not prepared for the respective connections, and priority control is not performed by the scheduler 211, the same function and effect as those described above can be obtained by making the queue manager 204 increase the packet drop ratio depending on whether a given connection belongs to the non-priority group or not.

As has been described above, according to general TCP, owing to slow start operation of exponentially increasing the transmission rate from the low rate immediately after connection establishment or congestion avoiding operation of linearly increasing the transmission rate a given period of time after connection establishment, the throughput in a connection with a small data size tends to decrease because a connection is terminated during the above slow start operation.

In contrast to this, according to the present invention, the fairness between TCP connections with different transfer data sizes can be improved regardless of the amount of data to be transmitted through each connection.

What is claimed is:

1. A packet transfer apparatus comprising:
packet classifying means which identifies a connection for transferring data between a transmission terminal and a reception terminal from not less than one field contained in a header of a reception packet received from the transmission terminal and detects establishment and release of the connection;
a scheduler which performs transfer control on a reception packet for each connection on the basis of connection information of each connection identified by said packet classifying means; and
a queue manager which sequentially stores reception packets in a queue corresponding to each connection identified by said packet classifying means,
wherein when selecting a connection for transfer of a reception packet, said scheduler selects a connection, of the respective connections, which exhibits the smallest data amount of reception packets transferred after connection establishment, and preferentially transfers a reception packet from a queue corresponding to the selected connection.

2. A packet transfer apparatus comprising:
packet classifying means which identifies a connection for transferring data between a transmission terminal and a reception terminal from not less than one field contained in a header of a reception packet received from the transmission terminal and detects establishment and release of the connection;
a scheduler which performs transfer control on a reception packet for each connection on the basis of connection information of each connection identified by said packet classifying means; and a queue manager which sequentially stores reception packets in a queue corresponding to each connection identified by said packet classifying means, wherein when selecting a connection for transfer of a reception packet, said scheduler selects a connection, of the respective connections, which exhibits the shortest elapsed time after connection establishment, and preferentially transfers a reception packet from a queue corresponding to the selected connection.

3. A packet transfer apparatus comprising:

packet classifying means which identifies a connection for transferring data between a transmission terminal and a reception terminal from not less than one field contained in a header of a reception packet received from the transmission terminal and detects establishment and release of the connection;

a scheduler which performs transfer control on a reception packet for each connection on the basis of connection information of each connection identified by said packet classifying means; and a queue manager which sequentially stores reception packets in a queue corresponding to each connection identified by said packet classifying means.

wherein when selecting a connection for transfer of a reception packet, said scheduler selects a connection, of the respective connections, in which a change in transfer rate over time increases and the amount of change is the largest, and preferentially transfers a reception packet from a queue corresponding to the selected connection.

4. A packet transfer apparatus comprising:

packet classifying means which identifies a connection for transferring data between a transmission terminal and a reception terminal from not less than one field contained in a header of a reception packet received from the transmission terminal and detects establishment and release of the connection;

a scheduler which performs transfer control on a reception packet for each connection on the basis of connection information of each connection identified by said packet classifying means; and a queue manager which sequentially stores reception packets in a queue corresponding to each connection identified by said packet classifying means, wherein said scheduler classifies connections into a plurality of groups on the basis of the data amounts of reception packets transferred after establishment of the respective connections, selects, as a connection for transfer of a reception packet, a connection exhibiting the smallest data amount from a group exhibiting a small data amount, and preferentially transfers a reception packet from a queue corresponding to the selected connection.

5. A packet transfer apparatus comprising:

packet classifying means which identifies a connection for transferring data between a transmission terminal and a reception terminal from not less than one field contained in a header of a reception packet received from the transmission terminal and detects establishment and release of the connection;

a scheduler which performs transfer control on a reception packet for each connection on the basis of connection information of each connection identified by said packet classifying means; and a queue manager which sequentially stores reception packets in a queue corresponding to each connection identified by said packet classifying means.

wherein said scheduler classifies connections into a plurality of groups on the basis of elapsed times after establishment of the respective connections, selects, as a connection for transfer of a reception packet, a connection exhibiting the shortest elapsed time from a group exhibiting a short elapsed time, and preferentially transfers a reception packet from a queue corresponding to the selected connection.

6. A packet transfer apparatus comprising:

packet classifying means which identifies a connection for transferring data between a transmission terminal and a reception terminal from not less than one field contained in a header of a reception packet received from the transmission terminal and detects establishment and release of the connection;

a scheduler which performs transfer control on a reception packet for each connection on the basis of connection information of each connection identified by said packet classifying means; and a queue manager which sequentially stores reception packets in a queue corresponding to each connection identified by said packet classifying means.

wherein said scheduler classifies connections into a plurality of groups on the basis of the amounts of change in transfer rate over time in the respective connections, selects, as a connection for transfer of a reception packet, a connection exhibiting the largest amount of change over time from a group in which the amount of change over time increases and the amount of change is large, and preferentially transfers a reception packet from a queue corresponding to the selected connection.

7. A packet transfer method comprising:

identifying a connection to be used for transfer of data between a transmission terminal and a reception terminal from not less than one field contained in a header of a reception packet received from the transmission terminal, and detecting establishment and release of the connection;

performing transfer control on a reception packet for each connection on the basis of connection information of each identified connection; and sequentially storing reception packets in a queue corresponding to each identified connection, wherein performing transfer control comprises preferentially transferring a reception packet from a queue corresponding to a connection, of the respective connections, which exhibits the smallest data amount of reception packets transferred after connection establishment.

8. A packet transfer method comprising:

identifying a connection to be used for transfer of data between a transmission terminal and a reception terminal from not less than one field contained in a header of a reception packet received from the transmission terminal, and detecting establishment and release of the connection;

performing transfer control on a reception packet for each connection on the basis of connection information of each identified connection; and sequentially storing reception packets in a queue corresponding to each identified connection, wherein performing transfer control comprises preferentially transferring a reception packet from a queue corresponding to a connection, of the respective connections, which exhibits the shortest elapsed time after connection establishment.

9. A packet transfer method comprising:
identifying a connection to be used for transfer of data between a transmission terminal and a reception terminal from not less than one field contained in a header of a reception packet received from the transmission terminal, and detecting establishment and release of the connection;
performing transfer control on a reception packet for each connection on the basis of connection information of each identified connection; and
sequentially storing reception packets in a queue corresponding to each identified connection,
wherein performing transfer control comprises preferentially transferring a reception packet from a queue corresponding to a connection, of the respective connections, in which the amount of change in transfer rate increases and the amount of change is the largest.

10. A packet transfer method comprising:
identifying a connection to be used for transfer of data between a transmission terminal and a reception terminal from not less than one field contained in a header of a reception packet received from the transmission terminal, and detecting establishment and release of the connection;
performing transfer control on a reception packet for each connection on the basis of connection information of each identified connection; and
sequentially storing reception packets in a queue corresponding to each identified connection,
wherein performing transfer control comprises:
classifying connections into a plurality of groups on the basis of the data amounts of reception packets transferred after establishment of the respective connections; and
when selecting a connection for transfer of a reception packet, preferentially transferring a reception packet from a queue corresponding to a connection, in a group exhibiting a small data amount, which exhibits the smallest data amount.

11. A packet transfer method comprising:
identifying a connection to be used for transfer of data between a transmission terminal and a reception terminal from not less than one field contained in a header of a reception packet received from the transmission terminal, and detecting establishment and release of the connection;
performing transfer control on a reception packet for each connection on the basis of connection information of each identified connection; and
sequentially storing reception packets in a queue corresponding to each identified connection,
wherein performing transfer control comprises:
classifying connections into a plurality of groups on the basis of elapsed times after establishment of the respective connections; and
when selecting a connection for transfer of a reception packet, preferentially transferring a reception packet from a queue corresponding to a connection, in a group exhibiting a short elapsed time, which exhibits the shortest elapsed time.

12. A packet transfer method comprising:
identifying a connection to be used for transfer of data between a transmission terminal and a reception terminal from not less than one field contained in a header of a reception packet received from the transmission terminal, and detecting establishment and release of the connection;
performing transfer control on a reception packet for each connection on the basis of connection information of each identified connection; and
sequentially storing reception packets in a queue corresponding to each identified connection,
wherein performing transfer control comprises:
classifying connections into a plurality of groups on the basis of the amounts of change in transfer rate over time in the respective connections; and
when selecting a connection for transfer of a reception packet, preferentially transferring a reception packet from a queue corresponding to a connection, in a group in which the amount of change over time increases and the amount of change is large, which exhibits the largest amount of change over time.

* * * * *